United States Patent [19]
Gergely

[11] 3,813,200
[45] May 28, 1974

[54] JAM PREVENTION UNIT FOR EXTRUSION PROCESS APPARATUS

[75] Inventor: Alex S. Gergely, Richmond, Va.

[73] Assignee: Phillip Morris Incorporated, New York, N.Y.

[22] Filed: Jan. 22, 1973

[21] Appl. No.: 325,595

[52] U.S. Cl.................. 425/140, 425/142, 425/315
[51] Int. Cl............................................... B29f 3/08
[58] Field of Search ............. 425/71, 136, 140, 142, 425/315; 264/135, 149, 150

[56] References Cited
UNITED STATES PATENTS

| | | | |
|---|---|---|---|
| 2,816,837 | 12/1957 | Holsman......................... | 425/140 X |
| 3,341,888 | 9/1967 | Bridge et al. ..................... | 425/71 X |
| 3,499,064 | 3/1970 | Tsuboshima et al............ | 425/140 X |
| 3,530,536 | 9/1970 | Thorman et al................ | 425/315 X |
| 3,538,210 | 11/1970 | Gatto............................. | 425/315 X |
| 3,579,623 | 5/1971 | Thomson et al.................... | 264/135 |

*Primary Examiner*—R. Spencer Annear

[57] ABSTRACT

A device which can be used to prevent a jam of the sizing aperture in the cooling chamber of extrusion process apparatus is disclosed. The device includes a cutter blade which, when an outsized extrudate that would cause a jam of the sizing aperture is detected, operates to sever the extrudate entering the cooling chamber from that already present therein to prevent the outsized extrudate being drawn into the sizing apparatus or being pushed into the same by the extruder pressure. The device also functions to close off the aperture to prevent loss of the liquid coolant in the event of a jam.

10 Claims, 5 Drawing Figures

JAM PREVENTION UNIT FOR EXTRUSION PROCESS APPARATUS

BACKGROUND OF THE INVENTION

It is known to form certain types of continuous stock workpieces, such as rod and tubular shaped articles, from thermoplastic material by extruding the same as a heated extrudate from an extruder followed by passage of the heated extrudate through a cooling bath to remove heat therefrom so as to set or rigidize the material of the continuous stock which thereafter may be sectioned into individual articles for a particular intended end use. The extrudate further may be shaped and sized by passing the same through a closing or sizing aperture located advantageously at the entrance to the cooling bath. U.S. Pat. Nos. 3,538,210 and 3,579,623 both describe methods with which tubular articles can be made, such articles being characterized by having circumferential dimension of precise nature within a particular range of values. As is well-known in the extrusion art, and as is exemplified by the aforementioned patents, the extrudate if it is in tubular form generally will be issued from the extruder at a size somewhat larger than the final finished product and then directed through the sizing aperture to draw down the extrudate to the requisite final dimension. The extrudate will have, for formation of a workpiece of given size and with respect to the extrudate line speed and placement of extruder in relation to the cooling bath entrance, a predetermined dimension during its travel from the extruder to the sizing aperture, such predetermined dimension diminishing uniformly as the extrudate approaches the closing aperture. If for any reason the extrudate should leave the extruding means at an outsized dimension, that is at a dimension greater than intended either by way of overall workpiece diameter at any given location, or by reason of greater thickness of the tube wall then intended, it is possible for the outsized extrudate upon entry through the closing aperture to jam the same. This can result in shutdown of the forming line apparatus as well as requiring that the aperture be freed, a not easy task because the plastic state extrudate when solidified in the aperture is difficult and time consuming to remove. Furthermore, if the extrudate were outsized to a point that it would cause a jam in the sizing aperture and a breakage in the extrudate occurred without fully jamming the sizing aperture, it is probable that cooling liquid from the bath thereof would escape through the aperture and splash onto adjacent machinery including the extruding apparatus to the detriment of the latter. Accordingly, it is desirable that there be provided apparatus for use in connection with the extrusion of a thermoplastic extrudate which functions to sever any outsized extrudate from that already processed in such manner as to prevent a jamming of the closing aperture in the cooling bath as well as to cover the said aperture to prevent loss of cooling liquid and possible damage to other components in the manufacturing line.

SUMMARY OF THE INVENTION

The present invention is concerned with apparatus for use in an extrusion processing line to sever any outsized extrudate feeding to a liquid filled cooling chamber, and having entry thereto through a sizing aperture in which said outsized extrudate might jam. In accordance with the invention, the apparatus includes a cutter blade mounted adjacent the sizing aperture and slidably movable between first and second operative positions, the cutter blade during its movement from first to second operative positions sliding through a course passing adjacent said closing aperture so that the cutter blade will sever the extrudate at the aperture. To detect the presence of any outsized extrudate issuing from the extruder unit, a photoelectric cell detection unit is provided in close proximity to the closing aperture. The photoelectric cell unit includes a light beam projector disposed such as to project a beam to a suitably positioned photoelectric cell in a beam path passing adjacent the travel course of the extrudate during its passage to the sizing aperture. If the extrudate is outsized from a desired predetermined dimension beyond certain allowable limit, the outsized extrudate will interrupt the light beam. Interruption of the light beam in turn will cause the operation through appropriate electrical control circuitry of a power operated device connected with the cutter blade to move the cutter blade from its first to second operative position. Additionally and concurrently the sizing aperture is closed off by the cutter blade when the latter has moved to its second operative position. The power operated device which controls movement of the cutter blade from its first to second operative positions can be an air operated piston connected directly to the cutting blade. Desirably the cutter blade is mounted on the end wall of the cooling chamber in which the extrudate is cooled and there is provided guide means to assure a proper sliding travel of the blade. Additionally, the circuitry controlling operation of the cutter blade can be connected with that controlling the operation of the extruder so that operation of the cutter blade will automatically result in shutdown of the extruder unit.

The invention accordingly comprises the features of construction, combination of elements and arrangements of parts which will be exemplified in the construction hereinafter set forth and the scope of the invention will be indicated in the claims.

BRIEF DESCRIPTION OF THE DRAWINGS

A fuller understanding of the nature and objects of the invention will be had from the following description taken in conjunction with the accompanying drawings, in which.

Throughout the following description like reference numerals are used to denote like parts in the drawings.

DESCRIPTION OF THE PREFERRED EMBODIMENTS

The present invention is related to apparatus with which a continuous workpiece of thermoplastic material is formed by an extrusion process, the continuous workpiece generally being extruded from an extruder at somewhat greater size than the final finished product, and then being passed through a cooling chamber in which the heated extrudate is cooled, the extrudate upon entry to the cooling chamber being drawn down and sized to the intended final workpiece dimension. The apparatus of the invention is suitable for use in connection with the forming of solid as well as tubular workpieces.

Figure 1:
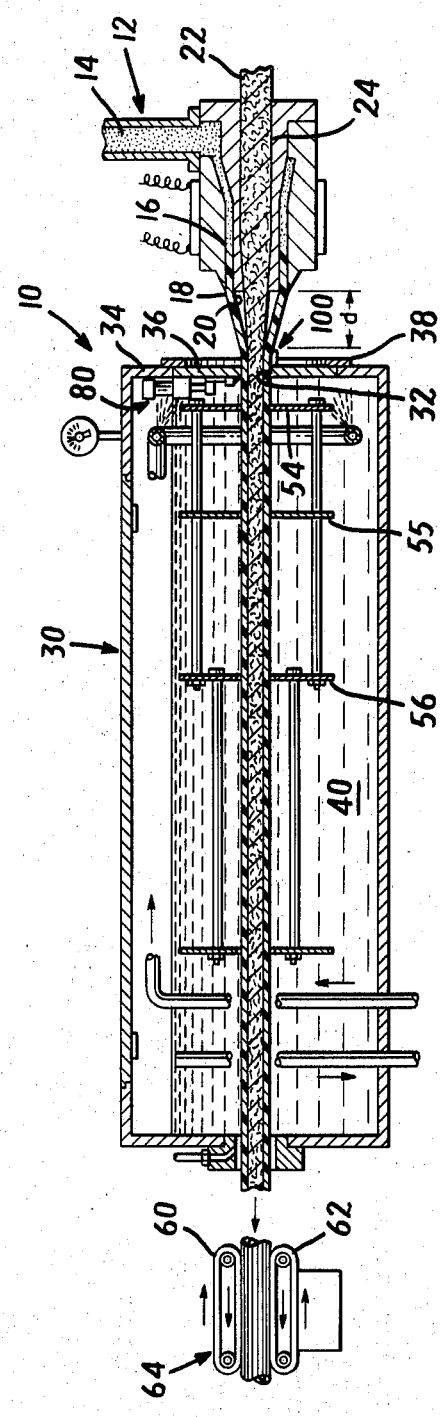
FIG. 1 is a sectional view of apparatus with which extruded plastic tubing may be made and sized, such apparatus being provided with a cutter blade and aperture sealing device to prevent jam up of the aperture in the event outsized extrudate issues from the extruder, such device being made in accordance with the present invention.

Referring now to FIG. 1 of the drawing, there is shown apparatus generally similar to that disclosed and described in the aforementioned U.S. Pat. No. 3,579,623, such apparatus being modified to the extent as provided by the present invention. Briefly, the apparatus 10 includes an extruder unit 12 of conventional construction and from which molten thermoplastic material 14 is forced by screw extruder means (not shown) through a channel 16 formed therein and outwardly of an orifice 18 in the form of a tubular continuous extrudate or workpiece 20 of a size somewhat greater than the intended finished workpiece. Concurrently a tow of fibrous material 22 is advanced coaxially with the extrudate 20 and issues from a central passage 24 in the extruder 12 so that the finished workpiece will comprise a filled tubular article although it will be understood the following description is equally applicable to formation of an unfilled workpiece and as well to forming a solid workpiece. In the particular described instance, the article is intended for use in providing a stock from which cigarette filter components are sectioned. The composite structure of the thermoplastic tubular component 20 and the two of fibrous material 22 enter the cooling chamber 30 through a sizing aperture 32 formed therein in one end wall 34 of the chamber. More particularly, the orifice or aperture can be provided in a wall section plate 36 (FIGS. 3-5) which forms part of the wall structure and secured thereto by means of an annular holding ring 38, such wall plate 36 desirably is a gland disc of the type described in U.S. Pat. Nos. 3,538,210 and 3,579,623. In the cooling chamber 30 there is provided a bath 40 of a liquid coolant and optionally an assembly of additional sizing and support rings 54–58, there being shown only a few of the latter, reference being had to the aforementioned U.S. Patents for further and full description of the manner in which said sizing and support rings and bath of liquid coolant function to remove heat from the heated extrudate and accurately size the continuous workpiece. The composite structure of the continuous length filled thermoplastic tube 20 with its filler 22 is advanced through the cooling chamber 30 by means of an advancing unit 64 which comprises two endless belt members 60, 62 engaged with the cooled and sized article downstream of the cooling chamber. As will be noted the level of liquid coolant 40 in the chamber 30 is located some distance above the aperture 32 formed in the end wall 34.

The present invention provides apparatus with which jamming of the production apparatus, and particularly, at the aperture 32 by outsized extrudate is prevented. Thus, if the thermoplastic extrudate 20 were to issue from the extruder unit 12 at a size in excess of that which will draw down to achieve proper passage through aperture 32 in company with the filler 24, the manufacturing process is stopped and the oversized extrudate severed from that already present in the cooling chamber. In this respect the extrudate 20 issues from the extruder 12 at a predetermined dimension being drawn down in a tapered configuration from exit of the extruder unit to entrance to the cooling chamber aperture 10, and it will be understood that such extrudate 20 at any given location in the passage between these two locations will have an intended predetermined outer peripheral dimension. If such predetermined dimension varies from that desired by a certain value, it is intended that the cutter unit shown generally at 80 will function to sever the extrudate entering the cooling chamber 30 from that already present in the latter structure and also concurrently close off the aperture 32 to prevent outflow of liquid coolant in such manner as might cause damage to the extruder unit 12 and associated machinery and controls.

Figure 4:
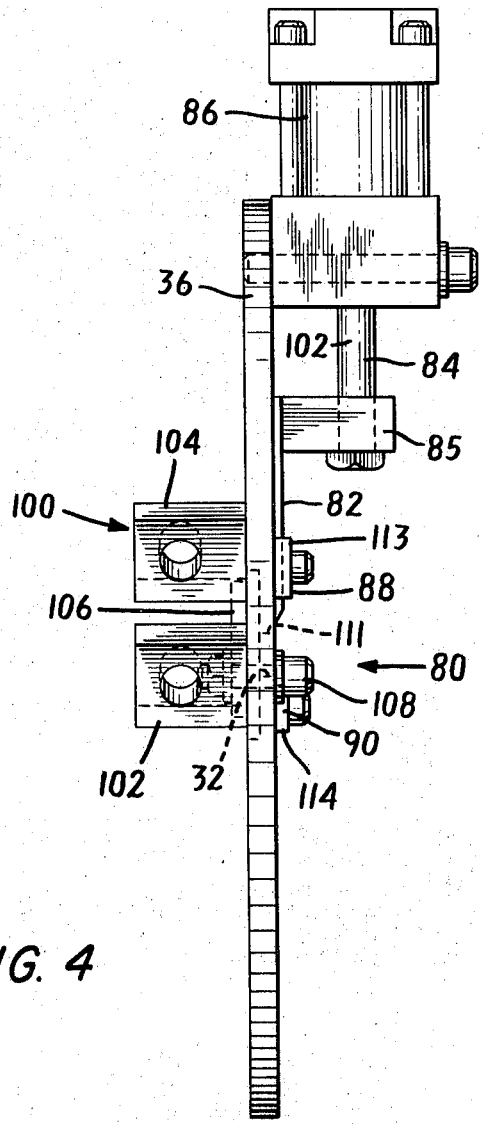
FIG. 4 is a side elevational view of FIG. 3.

Referring now to FIGS. 1 and 4, the cutter unit 80 works in cooperation with a detection unit 100 so that if the latter senses or detects an outsized dimension in the continuous tubular article issuing from the extruder device it will cause operation of the cutter unit 80 to effect severance of the extrudate. The sensing unit 100 is comprised of a photoelectric cell unit 102 disposed exteriorly of chamber wall 34 and functioning such that a light beam projected from beam projector 104 adjacent the travel course of the extrudate will be interrupted by an outsized extrudate component to therewith initiate closure of appropriate circuitry controlling the operation of the cutter unit 80. The cutter unit 80 which desirably is mounted interiorly of the wall 34 includes a cutter blade 82 which moves between first and second operative positions upon sensing of the presence of an outsized tubular component and moves in a sliding travel course adjacent the aperture 32 so that concurrently as the extrudate is severed, the aperture is closed.

Figure 3:
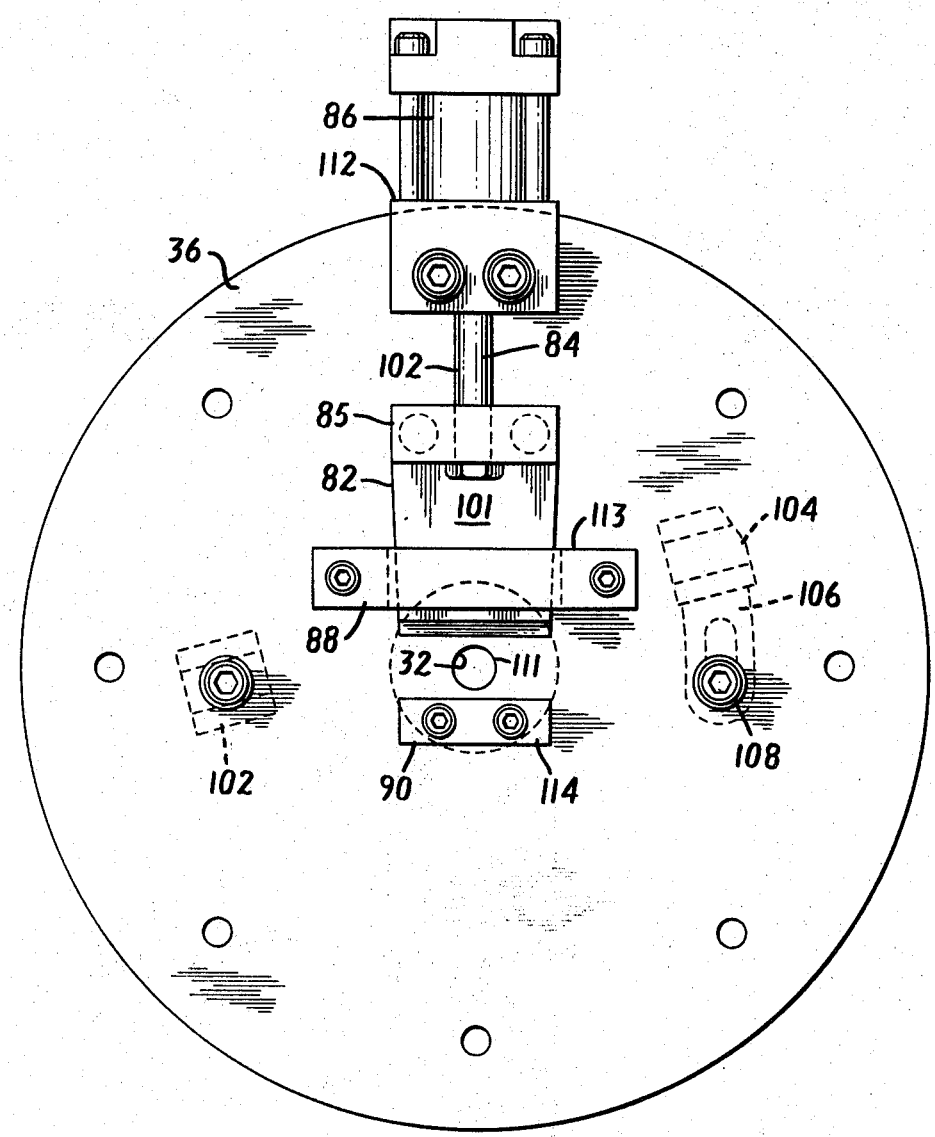
FIG. 3 is an end elevational view of an end wall section of the cooling chamber of the apparatus shown in FIG. 1 as viewed from the interior of the chamber and further showing the mounting of the cutter blade therein.
Figure 5:
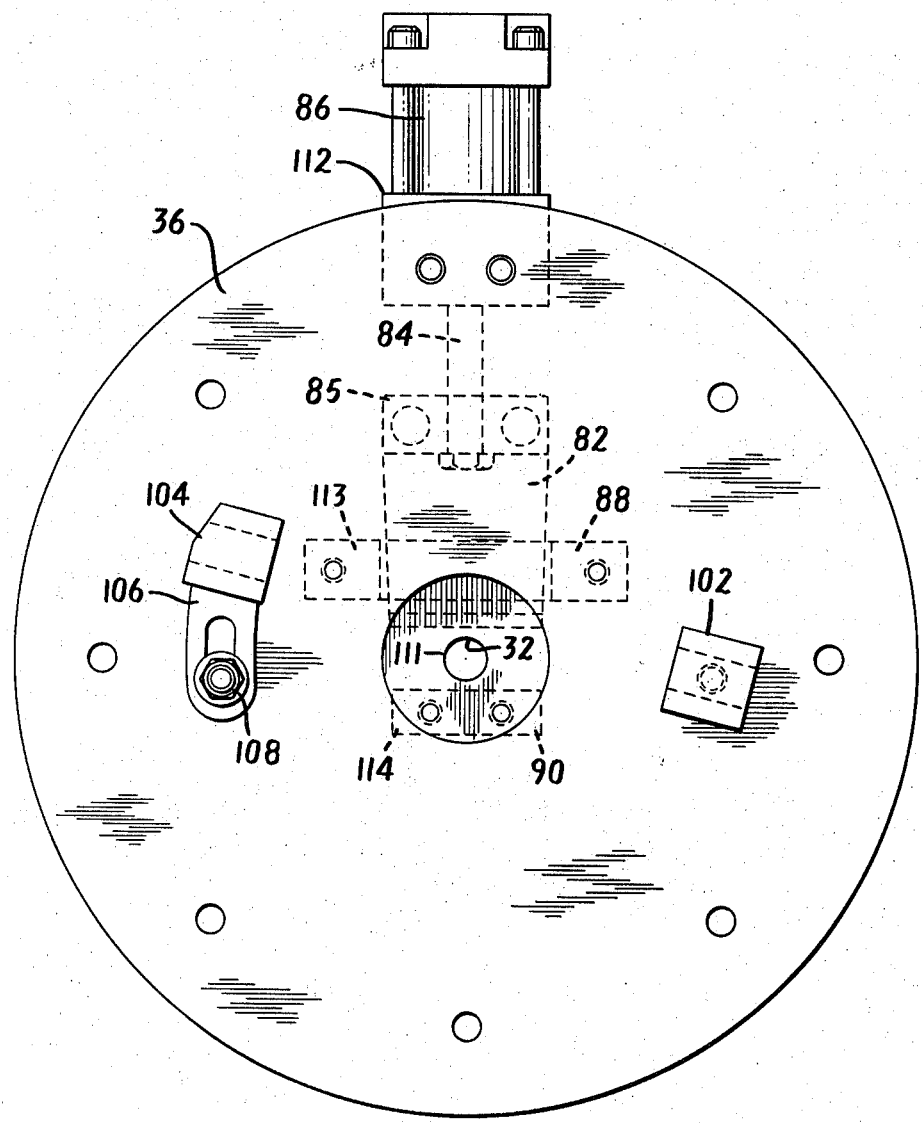
FIG. 5 is an end elevational view of the end wall section of the cooling chamber shown in FIGS. 3 and 4 except as viewed from the exterior thereof.

The constructional details of the cutter unit 80 and sensing means 100 will be best seen with reference to FIGS. 3-5 of the drawings. The cutter unit includes a cutter blade 82 mounted interiorly of the end wall 34 of chamber 30 and connected by means of rod 84 and block 85 to a power operated piston unit 86, the latter component being fixedly secured to the interior surface of wall section plate 36. The cutter blade is shown in FIGS. 3-5 in its first operative position in which it is disposed a distance above the aperture 32. Further, there is provided a guide bracket 88 which guides the cutter blade 82 during the course of its sliding travel from first to second operative positions, there also being provided an anvil 90 secured to wall section plate 36 at a location below the aperture and intended to cooperate with the cutter blade 82 as the latter reaches its second operative position to effect and insure complete and clean severance of the extrudate passing through the aperture 32. The sensing or detecting means 100 which is located on the external side of wall section 36 includes a light beam projector 104 disposed at one side of orifice 32 and which works in cooperation with a photoelectric cell 102 to detect the the presence of outsized extrudate. If the extrudate is sized beyond a certain allowable limit the light beam projected from projector unit 104 to photocell 102 will be interrupted by such outsized extrudate and the same will effect initiation of the operation of the cutter unit in the manner as will be described shortly. To accommodate altering the unit for use with different sizes of extruded articles, the light beam projector 104 is mounted adjustably on the end wall section plate 36, there being a slotted bracket 106 connected with the light beam projector unit which can be selectively positioned in respect of the orifice and photo cell by loosening the nut 108 to position the light beam projector in a desired location.

Figure 2:
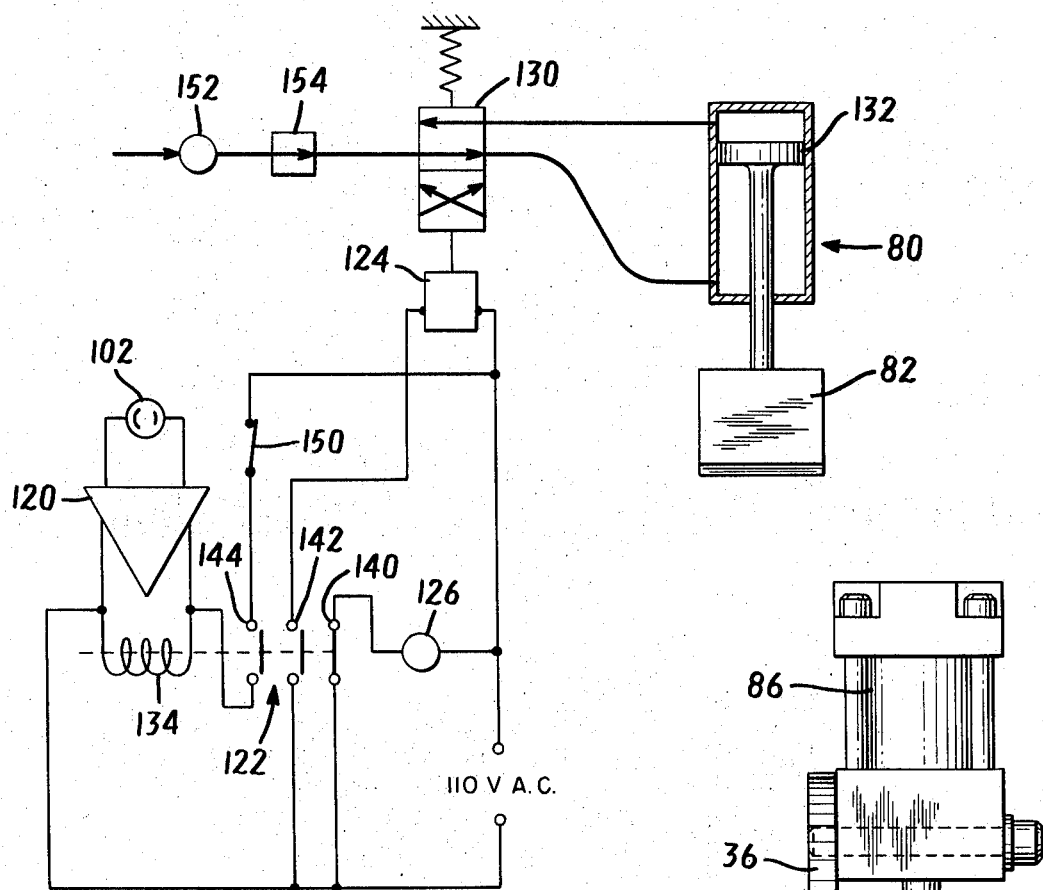
FIG. 2 is a circuit diagram depicting the means with which the photoelectric cell unit detects outsized extrudate and functions to operate the cutter blade unit to sever the extrudate and close the sizing aperture.

FIG. 2 is a schematic depiction of the circuitry associated with the apparatus of the present invention. Thus, the photoelectric cell 102 is in circuit with an amplifier 120 and a three contact set relay 122. The relay 122 controls the 110 volt a.c. circuit in which is provided a solenoid 124, motor 126 which operates the extruder unit 12, and a latching circuit to hold the cutter blade in its second position following movement to such position and after restoration of the detection unit to normal sensing condition following removal of any outsized extrudate which may have caused deactivation of the sensing unit. With the apparatus in normal operation and the sensing unit 100 activated to detect the presence of any outsized extrudate, the light beam from the light beam projector 104 will pass uninterrupted to the photo cell unit 102. Further, contact set 140 of relay 122 will be closed and extruder motor 126 will drive the extruder unit 12. If an outsized extrudate should issue from the extruder, the same will interrupt the light beam which condition will in turn be sensed by the photoelectric cell 102. When the light beam is interrupted, the amplifier 20 will operate to energize the coil 134 associated with the relay 122 to interrupt the circuit and to pull the contacts therein to positions in which contacts 142 close and the circuit to the solenoid 124 is closed. This will cause solenoid 124 to operate to shift the positioning of the air control valve 130 to an orientation in which air will be admitted through filter 152 and regulator 154 above the piston 132 of the cutter unit 80 to drive the blade 82 downwardly moving it from its first to second operative positions. During the course of such travel the cutter blade will sever any extrudate entering the cooling chamber from extrudate already present in such chamber and concurrently will when it reaches its second operative position close aperture 32. Advance means 60 will continue to operate to remove any such extrudate present in chamber 30. Relay unit 122 also includes a third set of contacts 144 which when the light beam is interrupted, close to form a holding circuit to maintain the solenoid 124 energized and thereby maintain the cutter blade in its second operative position. In circuit with the third set of contacts 144 is a switch 150 which is normally closed, so to deenergize the solenoid 124 following restoration of the apparatus for normal operation and return the cutter blade 82 from its second to first operative positions, switch 150 must be opened.

It will thus be seen that the objects set forth above among those made apparent from the foregoing description are efficiently attained and, since certain changes in the construction set forth which embody the invention may be made without departing from its scope, it is intended that all matter contained in the above description shall be interpreted as illustrative and not in a limiting sense.

What is claimed is:

1. In apparatus for forming a continuous thermoplastic workpiece including
    means for extruding a continuous workpiece of thermoplastic material as an extrudate of predetermined dimension and heated to a temperature at which it can be plastically deformed,
    means defining a chamber,
    a bath of liquid coolant in said chamber,
    means for advancing said heated extrudate through a shapeing aperture in said chamber disposed below the level of coolant in said bath and into said bath for cooling said extrudate,
    detection means for detecting any outsized variation in dimension of said extrudate from said predetermined dimension beyond a certain allowable limit as it makes entry to said aperture, and
    means operable responsive to operation of said detection means for severing said extrudate at a location adjacent said aperture to prevent entry therethrough of outsized extrudate, said last-mentioned means operating concurrently to cover said aperture to prevent outflow of coolant from said bath through said aperture.

2. The apparatus of claim 1 in which the means for severing said extrudate comprises a cutter blade slidably movable from first to second operative positions through a travel course passing adjacent said aperture, said cutter blade functioning to separate any extrudate present in said chamber from any outside extrudate upstream of said aperture during travel of said cutting blade from said first to second position, said cutter blade in said second position covering said aperture.

3. The apparatus of claim 2 in which said advancing means is located downstream of said chamber whereby severed extrudate present in said chamber is removed therefrom following movement of said cutter blade from said first to second operative positions.

4. The apparatus of claim 2 in which said cutter blade is moved from said first to said second operative positions by a power operated device.

5. The apparatus of claim 4 in which said power device is an air operated piston.

6. The apparatus of claim 5 in which said chamber is an elongated structure and has an end wall conaining said aperture, said cutting blade and piston being mounted on said end wall for sliding travel of said cutting blade along said end wall.

7. The apparatus of claim 6 in which guide means are provided for guiding said cutter blade during the course of its sliding travel between said first and second operative positions.

8. The apparatus of claim 7 in which there is provided an anvil disposed at the location of the end of sliding travel of said cutter blade from said first to said second positions for facilitating effecting severance of said extrudate.

9. The apparatus of claim 1 in which said chamber is an elongated structure having an end wall containing said aperture, said cutting blade and piston being mounted interiorly of said chamber, said detection means comprising a photoelectric sensing unit mounted exteriorly of said end wall, said photoelectric sensing unit including a photoelectric cell and light beam projector positioned to project a light beam against said cell and adjacent the travel course of said extrudate downstream of said extruding means and upstream of said aperture, said photocell and light beam being positioned such that outsized dimension in said extrudate interrupts the passage of said light beam from said projector means to said photo cell.

10. The apparatus of claim 9 in which said light source is adjustably mounted on said end wall to alter the allowable limit beyond said extrudate predetermined dimension which will cause interruption of said light beam.

* * * * *